(12) United States Patent
Hoshall

(10) Patent No.: US 10,080,059 B2
(45) Date of Patent: Sep. 18, 2018

(54) WEB-BASED VIDEO BROADCASTING SYSTEM HAVING MULTIPLE CHANNELS

(75) Inventor: Tom Hoshall, Oklahoma City, OK (US)

(73) Assignee: Apple Partners, LP, Oklahoma City, OK (US)

(*) Notice: Subject to any disclaimer, the term of this patent is extended or adjusted under 35 U.S.C. 154(b) by 358 days.

(21) Appl. No.: 12/770,432

(22) Filed: Apr. 29, 2010

(65) Prior Publication Data

US 2011/0271314 A1 Nov. 3, 2011

(51) Int. Cl.
| | |
|---|---|
| H04N 7/173 | (2011.01) |
| H04N 21/482 | (2011.01) |
| H04N 21/443 | (2011.01) |
| H04N 21/4782 | (2011.01) |
| H04N 21/61 | (2011.01) |
| H04N 21/81 | (2011.01) |

(52) U.S. Cl.
CPC ....... *H04N 21/482* (2013.01); *H04N 21/4438* (2013.01); *H04N 21/4782* (2013.01); *H04N 21/6125* (2013.01); *H04N 21/6175* (2013.01); *H04N 21/812* (2013.01); *H04N 21/8133* (2013.01)

(58) Field of Classification Search
CPC ............ H04N 21/482; H04N 21/4438; H04N 21/4782; H04N 21/6125; H04N 21/6175; H04N 21/812; H04N 21/8133
USPC ......... 724/109, 114–116, 144–146; 725/109, 725/114–116, 144–146
See application file for complete search history.

(56) References Cited

U.S. PATENT DOCUMENTS

| | | | |
|---|---|---|---|
| 6,874,152 B2 * | 3/2005 | Vermeire et al. | 719/330 |
| 7,103,905 B2 | 9/2006 | Novak | |
| 8,296,185 B2 * | 10/2012 | Isaac | 705/14.55 |
| 2002/0184630 A1 | 12/2002 | Nishizawa et al. | |
| 2006/0010468 A1 | 1/2006 | Loughridge | |
| 2007/0124779 A1 | 5/2007 | Casey et al. | |
| 2007/0136693 A1 * | 6/2007 | Lilleness et al. | 715/835 |
| 2007/0157228 A1 | 7/2007 | Bayer et al. | |
| 2008/0114868 A1 * | 5/2008 | Thayer et al. | 709/223 |
| 2008/0178236 A1 * | 7/2008 | Hoshall | 725/109 |

(Continued)

OTHER PUBLICATIONS

"How do I set up domain forwarding." http://web.archive.org/web/20071030175641/http://help.yahoo.com/l/us/yahoo/smallbusiness/domains/domainfeatures/forwarding/forwarding-01.html. pp. 1-4. Oct. 30, 2007.*

(Continued)

*Primary Examiner* — Farzana Hossain
(74) *Attorney, Agent, or Firm* — Dunlap Codding, P.C.

(57) ABSTRACT

A video broadcast system comprising a web page having a web page address and being in communication with a host system to permit users and a content providers to access the host system. The host system is programmed to permit the content provider to register at least one channel and associate the channel with the content provider, selectively upload to the host system a video file and associate the video file with the channel, and associate a link source address with the channel, wherein the link source address is different from the web page address. The host system is further programmed to permit the content provider to determine which of the channels registered with the host system are accessible by the user accessing the host system from the link source address.

2 Claims, 7 Drawing Sheets

(56) References Cited

U.S. PATENT DOCUMENTS

| | | | |
|---|---|---|---|
| 2008/0189752 A1 | 8/2008 | Moradi et al. | |
| 2008/0201740 A1 | 8/2008 | Boyer et al. | |
| 2008/0307475 A1 | 12/2008 | Liwerant et al. | |
| 2009/0070832 A1 | 3/2009 | Urban | |
| 2009/0320073 A1 | 12/2009 | Reisman | |
| 2010/0023397 A1* | 1/2010 | Goldman et al. | 705/14.48 |
| 2010/0070862 A1* | 3/2010 | Partovi et al. | 715/716 |
| 2011/0072046 A1* | 3/2011 | Chi | 707/773 |

OTHER PUBLICATIONS

Beeline TV—Watch TV Online—Free Internet TV Channels, http://web.archive.org/web/20070703023305/http://beelinetv.com/, internet archived on Jul. 3, 2007; pp. 1-7.

About blip.tv; About Blip; http://web.archive.org/web/20070624045454/blip.tv/about/, internet archived on Jun. 24, 2007, pp. 1-3.

blip.tv (beta), http://web.archive.org/web/20070624032142/http://blip.tv/ archived on Jun. 24, 2007; Full article, It's Not All YouTube—The Web Is a Trove of Watchable Videos, by Walter S. Mossberg, Mar. 1, 2007, 6 pages.

Brightcove (beta)—FAQ; Help, http://web.archive.org/web/20070701083327/http://www.brightcove.com/help/; archived on Jul. 1, 2007, pp. 1-9.

Broadcaster.com—Home—Viral Video Clips, Live Community, News, Software, Movies, . . . ; http://web.archive.org/web/20070625075751/www.broadcaster.com/aboutus; archived on Jun. 25, 2007, pp. 1 of 1.

Welcome to Broadcaster.com—Home—Viral Clips, Live Community, News, Software, Movies, . . . ; http://web.archive.org/web/20070624002309/http://www.broadcaster.com/; archived on Jun. 24, 2007, pp. 1-2.

Channelchooser is a free TV-portal. Watch here only the best online news, entertainment, sports and music TV-channels and videos. Pick, push and play on Channelchooser; http://web.archive.org/web/20070704165306/http://channelchooser.com/; archived on Jul. 4, 2007, pp. 1-5.

Free Internet TV—Channel King, "Welcome to Channel King! We offer over 230 free Internet TV channels, get started by selecting one below", http://web.archive.org/web/20070701204521/http://www.channelking.com/, archived on Jul. 1, 2007, pp. 1 -2.

Current TV, "The TV Network Created by the People Who Watch It," http://web.archive.org/web/20070630230739/http://www.current.tv/, archived on Jun. 30, 2007, pp. 1-2.

Dailymotion—Share Your Videos, "FAQ Frequently Asked Questions, Dailymotion", http://web.archive.org/web/20070605124702/www.dailymotion.com/faq; archived on Jun. 5, 2007, pp. 1-8.

Dailymotion—Share Your Videos advertising, http://web.archive.org/web/20070630202948/www.dailymotion.com/us; archived on Jun. 30, 2007, p. 1 of 1.

Free internet tv, fantasy tv.com, watch TV live internet, free live Internet TV broadcast, Fr . . . ; http://web.archive.org/web/20070627023424/http://www.fantasy-tv.com/index.html; archived on Jun. 27, 2007, p. 1 of 1.

"Find Internet TV, Search, Find. Watch—About Us"; http://web.archive.org/web/20070702172146/www.findinternettv.com/About.aspx; archived on Jul. 2, 2007, pp. 1-3.

Find Internet TV—Search. Find. Watch TV on the Internet, New Features; http://web.archive.org/web/20070702232413/http://www.findinternettv.com/; archived on Jul. 2, 2007, pp. 1-6.

Free TV on PC Software.com, "Free TV on PC Software Version 5.0," http://www.freetvonpcsoftware.com "Are You Tired of Watching the Same Boring TV Programs?—Frequently Asked Questions" http://web.archive.org/web/20070602143613/www.freetvonpcsoftware.com/faqs.asp; archived on Jun. 21, 2007, Copyright 2007 All My Ideas, LLC; p. 1-2.

Watch Free TV on Your PC, "Free TV on PC Software version 5.0, Our Software has Tons of Great Benefits!", http://www.freetvonpcsoftware.com ; Copyright 2007 All My Ideas LLC; http://web.archive.org/web/20070705053131/http://www.free-sky-tv.us/; archived on Jul. 5, 2007, pp. 1-2.

Watch online news, entertainment, music and sports TV-channels for free, Channelchooser is a free TV-portal; http://web.archive.org/web/20070704165306/http://channelchooser.com/; archived on Jul. 4, 2007, pp. 1-5.

Friction.tv, "About Friction.tv," We are good listeners; *Friction.tv—spark the debate*, http://web.archive.org/web/20070606212418/www.friction.tv/about_us.php; archived on Jun. 6, 2007, pp. 1-2.

Friction.tv, "Welcom Friction.tv offers you the platform to stand up and make yourself heard! Start new debates or fire back your opinion at others. It's time to make up your mind, upload your video and spark the debate," Friction.tv—spark the debate; http://web.archive.oro/web/20070704212355/http://www.friction.tv/; archived on Jul. 4, 2007, pp. 1-3.

The gofish team, Video, "Free video clips and films at GoFish. Watch free funny video clips and more!;" *Made-for-Internet Shows*; 2005-2007 GoFish Corporation; http://web.archive.org/web/20070702224954/http://www.gofish.com/; archived on Jul. 2, 2007, pp. 1-5.

green.tv >> Video, "*Highlights*" what do you think of the films on green.tv? *talk on our blog*?; http://web.archive.org/web/20070625035530/http://www.green.tv/; archived on Jun. 25, 2007, pp. 1-4.

Free Internet TV—Watch Live TV broadcasts on the Internet!, Hollersoft, Download Free Internet TV; http://web.archive.org/web/20070623151135/www.holersoft.net/tv.htm; archived on Jun. 23, 2007, Copyright 2001-2007 www.holersoft.net. pp. 1-2.

Holersoft—Free Internet TV, an Internet television tuner program; Free Internet TV; Copyright 2001-2007 www.holersoft.net; http://web.archive.org/web/20070627005401/http://www.holersoft.net/; archived on Jun. 27, 2007; pp. 1 of 1.

Watch Free TV Channels at Imvite.com, About Us; http://web.archive.org/web/20070426044021/www.imvite.com/about.php; archived on Apr. 26, 2007, p. 1 of 1.

Imvite.com, "Live Online TV, Funny Videos, and Games at Imvite", "Imvite is Your Source for Online TV and Videos!", Copyright 2007 Imvite, Inc., http://web.archive.org/web/20070523091153/http://www.imvite.com/; archived on May 23, 2007, pp. 1 of 1.

Inet-TV.us, Inet-TV Version 2.1, Satellite TV on your PC; http://web.archive.org/web/20070626051750/http://inet-tv.us/; archived on Jun. 26, 2007, pp. 1-3.

"i" tv, "InternetTVaccess", internetTVaccess.com, frequently asked questions, http://web.archive.org/web/20070624064307/www.internettvaccess.com/faq.asp; archived on Jun. 24, 2007, p. 1 of 1.

Internet TV access, Satellite tv; Introduction page; No subscription needed & no recurring Charges . . . Ever!!; http://web.archive.org/web/20070620151938/http:/www.internettvaccess.com/; archived on Jun. 20, 2007; p. 1 of 1.

joiningthedots.tv, Independent film for independent people, "About", Register Now, http://web.archive.org/web/20070219121015/www.joiningthedots.tv/about.html; archived on Feb. 19, 2007, p. 1 of 1.

joiningthedots.tv, independent film for independent people, Home, Register Now, http://web.archive.org/web/20070219110141/http://www.joiningthedots.tv/; archived on Feb. 19, 2007, p. 1 of 1.

Joost—About us, TV anywhere, anytime . . . ; Joost—next-generation TV; http://web.archive.org/web/20070623052803/www.joost.com/about.html; archived on Jun. 23, 2007, pp. 1-3.

Joost—The new way of watching free, full-screen, high-quality TV on the internet; "The new way of watching TV", Countdown to Joost™; http://web.archive.org/web/20070701073435/http://www.joost.com/; archived on Jul. 1, 2007, pp. 1-2.

Our Story—Online Television—English, About JumpTV, "Our Story", archived on Jun. 23, 2007, http://web.archive.org/web/20070623033259/www.jumptv.com/en/about; pp. 1-2.

Free Online TV: Watch Free Global TV and Online Video from JumpTV—Online Televi . . . ; Now Watch TV for Free on JumpTV; http://web.archive.org/web/20070705183755/http://www.jumptv.com/; archived on Jul. 5, 2007, pp. 1-7.

KTVB.com—7 on Demand Video, Idaho News Now, Member Center, http://web.archive.org/web/20061031125005/www.ktvb.com/video/; Copyright 2006 KTVB-TV; archived on Oct. 31, 2006, pp. 1-9.

(56) References Cited

OTHER PUBLICATIONS

Link TV—FAQ: Programs and Schedule, Support Link TV Programs and Schedule FAQ; http://web.archive.org/web/20070518230721/http://www.linktv.org/help/programs; archived on May 18, 2007; pp. 1-3.
Link TV—Television Without Borders, Global and national news, uncompromising documentaries and diverse cultural programs, connecting you to the . . . ; http://web.archive.org/web/20070703070954/http://www.linktv.org/; archived on Jul. 3, 2007, pp. 1-3.
liveplayer.tv: Live Internet TV stations. More than 3000 channels, Sports, TV shows, Mo . . . ; "Frequently Asked Questions", Copyright 2007, liveplayer.tv; http://web.archive.org/web/20070624163611/liveplaver.tv/faq.asp ; archived on Jun. 24, 2007, pp. 1-3.
liveplayer.tv: Live Internet TV stations. More than 3000 channels, Sports, TV shows, Mo . . . ; liveplayer.tv provides a wide selection of the best broadband Internet television channels; http://web.archive.org/web/20070628232500/http://liveplayertv/; Copyright 2007, liveplayer.tv; archived on Jun. 28, 2007, pp. 1-4.
MainaTV!, "About ManiaTV!", The ManiaTV! Network http://web.archive.org/web/20070524024159/www.maniatv.com/About/Us; archived on May 24, 2007, pp. 1-2.
Watch Live and on Demand Internet Television or Create Your Own TV Channel—ManiaTV, Home page; http://web.archive.org/web/20070526093153/http://www.maniatv.com/; archived on May 26, 2007, pp. 1-4.
About MediaZone, "Media Zone is a leading global online broadcaster specializing in sports, entertainment, and international programming. We offer subscription and pay-per-view access to live and On Demand programs to a substantial and fast-growing paid customer base", Looking for a truly viable online broadcast solution? http://web.archive.org/web/20070621013955/http://corp.mediazone.com/corp/, archived on Jun. 21, 2007, p. 1 of 1.
Internet TV—MediaZone, Frequently-Asked-Questions (FAQ), http://web.archive.org/web/20070616113934/www.mediazone.com/mediazone/faq.jsp, archived on Jun. 16, 2007; pp. 1-3.
Internet TV and Video, mediazone, "Watch the 2007 Indianpolis 500", MediaZone is TV on the Web; Copyright 2007 MediaZone, http://web.archive.org/web/20070614163532/www.mediazone.com/channel/new_homepag . . . , archived on Jun. 14, 2007, pp. 1 of 1.
Web 2.0 video clips sharing community—Metacafe, Site Video Search and Family Filter Settings, About Us, http://web.archive.org/web/20070630012809/http://www.metacafe.com/aboutUs/, archived on Jun. 30, 2007, pp. 1-2.
Metacafe—Best Videos & Funny Movies, Site Video Search and Family Filter Settings, Copyright © 2003-2007 Metacafe, Inc., http://web.archive.org/web/20070705164340/http://www.metacafe.com/, archived on Jul. 5, 2007, pp. 1-8.
Help Center at MusicPlusTV.com/help/index.php, Watch M+Live, "MusicPlusTV.com", help center>Frequently Asked Questions, http://web.archive.org/web/20070510035652/musicplustv.com/help/index.php, archived on May 10, 2007, Copyright © 2004-2007 Music Plus Television Network, Inc., pp. 1-5.
MusicPlusTV.com: version 3.0; http://web.archive.org/web/20070705051819/http://musicplustv.com/; archived on Jul. 5, 2007, pp. 1-2.
MyEasyTV.com—Watch TV Online for free—Sports, Movies, News, Music, Cartoons an . . . , Welcome to MyEasyTV.com http://web.archive.org/web/20070702011354/http://www.myeasytv.com/index.html, archived on Jul. 2, 2007, Copyright 2007 © MyEasyTV.com; pp. 1-2.
Narrowstep—the TV on the Internet Company Provides Internet TV Sofware Platforms, Services, and Solutions; About Us, © 2007 Narrowstep™;; http://web.archive.org/web/20071021003105/www.narrowstep.com/about/06252007-Frontier-Launch; archived on Oct. 21, 2007, pp. 1-3.
Network2 TV Online Guide/About, Narrowstep—Internet TV Company, Internet platform, Internet TV products, Internet . . . ; Narrowstep—the TV on the Internet Company Provides Internet TV Software Platforms, Services, and Solutions;, archived on Jun. 26, 2007, http://web.archive.org/web/20070626105223/http://www.narrowstep.com/; pp. 1 of 1.
Network2 TV Online Guide/About; Network2, "your guide to tv on the internet Suman", http://web.archive.org/web/20070516021114rn_1/network2.tv/about/; archived on May 16, 2007, pp. 1-3.
Network2 TV Online Guide/Home; Network2, "your guide to tv on the Internet Suman", http://web.archive.org/web/20070629172801rn_1/network2.tv/; Archived on Jun. 29, 2007, pp. 1-4.
Revver, "What is Revver?", http://web.archive.org/web/20070617022508/http;//one.revver.com/go/about; archived on Jun. 17, 2007, Copyright 2007 Revver, Inc., pp. 1-4.
Revver, "Satacracy 88 ep9 part 3", http://web.archive.org/web/20070705162530/http://one.revver.com; archived on Jul. 5, 2007, pp. 1-6.
Outloud.TV—About, Copyright © 2003-2007 Outloud.TV Foundation; http://web.archive.org/web/20070705071514/www.outloud.tv/about/ ; archived on Jul. 5, 2007, pp. 1 of 1.
Outloud.TV—Broadcast your video's everywhere! Copyright © 2003-2007 Outloud.TV Foundation; http://web.archive.org/web/20070705071304/http://www.outloud.tv/; archived on Jul. 5, 2007; pp. 1-5.
You Are What You Watch: Online Video and TV Channels—Pyro.TV Publishers Page, "3 Great Reasons to Become a Pyro.TV Publisher", http://web.archive.org/web/20070702030059/www.pyro.tv/publishers/; archived on Jul. 20, 2007, pp. 1 of 1.
Pyro.TV Support—Frequently Asked Questions You Are What You Watch: Online Video and TV Channels—Pyro.TV Support Page;Copyright © 2007 Vibe Solutions Group; http://web.archive.org/web/20070702030029/www.pyro.tv/support/ ; archived on Jul. 20, 2007, pp. 1-2.
Revision3—About Us, Get Rev3 gear!, Copyright 2006-2007, Revision3 Corporation; http://web.archive.org/web/20070614092153/revision3.com/about; archived on Jun. 14, 2007, pp. 1-3.
Revision3, Get Rev3 gear! Copyright 2006-2007 Revision3 Corporation; Episodes, http://web.archive.org/web/20070629142541/http://revision3.com/; archived on Jun. 29, 2007, pp. 1-4.
Rocketboom RSS, The Jet Set Show—"For the kid in all of us", Rocketboom, P.O. Box 804, Planetarium Station, New York, NY 10024-0545; http://web.archive.org/web/20070310144330/www.rocketboom.com/vlog/about.html, archived on Mar. 10, 2007, pp. 1-3.
ROCKETBOOM2.0, daily with Joanne, Wednesday Mar. 7, 2007: daily; http://web.archive.org/web/20070308070833/www/rocketboom.com/vlog/; archived on Mar. 8, 2007, pp. 1 of 1.
SatellitePro.TV, Over 2000 TV Stations on your PC or Laptop for free!!, Instantly Turn your Computer into a Super TV; Copyright 1998-2007 Satellitepro.tv; http://webarchive.org/web/20070219225000/http://www.satellitepro.tv/; archived on Feb. 19, 2007, pp. 1-7.
Watch all your favorite television shows, cartoons, movies, and anime online! For free @ ShowStash.com; Television, Cartoons, Anime and Movies; http://web.archive.org/web/20070706180305/http://www.showstash.com/; archived on Jul. 6, 2007; pp. 1-4.
About Us—Free P2P Internet TV/live football, NBA, cricket About Us; http://web.archive.org/web/20070626193344/www.sopcast.org/info/aboutus.jsp; archived on Jun. 26, 2007, pp. 1 of 1.
SopCast—Free P2P internet TV/live, football, NBA, cricket; Latest Version: SopCast 1.1.2; Easy way to embed SopCast Copyright © 2006 SopCast.com; http://web.archive.org/web/2007070703213009/http://www.sopcast.org/; archived on Jul. 3, 2007, pp. 1-2.
Free P2P internet TV/ live football, NBA, cricket; User Manual, http://web.archive.org/web/20070624171517rn_1/www.sopcast.org/doc/; archived on Jun. 24, 2007, pp. 1-7.
http://www.squidtv.net/;Squid TV;Internet Television Guide; Hotel Guide; http://web.archive.org/web/20070606193944/http://squidtv.net/; Copyright © 2001-2007 archived on Jun. 6, 2007, pp. 1 of 1.
Stage6—Upload Video Clips, Share, Watch, Download Videos; Hello and welcome to Stage6, http://web.archive.org/web/20070617064358/stage6.divx.com/info/about; archived on Jun. 17, 2007; pp. 1 of 1.
Stage6—Upload Video Clips, Share, Watch, Download Videos; "Featured videos", Featured channels and Who waited in line for an

(56) References Cited

OTHER PUBLICATIONS iPhone? http://web.archive.org/web/20070617064358/stage6.divx.com/info/about; archived on Jun. 17, 2007, pp. 1-2.
Satellite TV for PC, "FAQ", http://web.archive.org/web/20070614032107/www.tv-4-pc.com/faq.asp; © 2007, www.tv-4-pc.com; Archived on Jun. 14, 2007, pp. 1-2.
Satellite TV for PC, "100% Legal. No hacking or cracking. No extra hardware needed. Use our software to get instant access to more than 2500 Satellite TV channels from all over the world. Now with on Demand TV", http://web.archive.org/web/20070605034234/http://www.tv-4pc.com/; archived on Jun. 5, 2007; pp. 1 of 1.
TVU networks/Welcome, "The best way to watch: Get the Free TVUPlayer," © Copyright 2007, TVU networks; http://web.archive.org/web/20070703001222/http://www.tvunetworks.com/; archived on Jul. 3, 2007, pp. 1 of 1.
TVU networks/What is TVU networks? "What is TVU networks?", http://web.archive.org/web/20070630112934/pages.tvunetworks.com/doc/whatis.html; © Copyright 2007, TVU networks; archived on Jun. 30, 2007, pp. 1 of 1.
Upstream.tv, "Live Interactive Video for Everyone. Create your own broadcast! It takes just minutes . . . ", http://web.archive.org/web/20070702150546/ustream.tv/get-started; archived on Jul. 21, 2007, pp. 1-3.
Ustream.tv, "Live Interactive Video for Everyone", Sign Up!, http://web.archive.org/web/20070705093402/http://ustream.tv/; archived on Jul. 5, 2007, pp. 1-8.
uVu—An online video portal for the South Florida community powered by WPBT Chann . . . ; "Browse by Category", http://web.archive.org/web/20070426035052/uvu.channel2.org/PublicSite/About.aspx; archived on Apr. 26, 2007; pp. 1 of 1.
uVu—An online video portal for the South Florida community powered by WPBT Chann . . . ; "Header—Meet, Watch, Share", http://web.archive.org/web/20070506074212rn_1/uvu.channel2.org/PublicSite/Default.aspx; archived on May 6, 2007, pp. 1 of 1.
Veg TV About Us, "vegtv.com, About Us" Your Host Marie Oser; Veg TV Inc., 2005; http://web.archive.org/web/20070608045637/www.vegtv.com/AboutUs/index.htm; archived on Jun. 8, 2007, pp. 1-2.
Welcome to VEG TV!, "Join the Online Video Revolution! Free Video! no tools, no software, no cost, no kidding! We do it all!", Forum & Taste of Health, http://web.archive.org/web/20070609112335/http://www.vegtv.com/; archived on Jun. 9, 2007, pp. 1-3.
FAQ/Veoh Video Network, "Frequently Asked Questions", http://web.archive.org/web/20070621044059/appserver.veoh.com/static/corporate/faq.html; archived on Jun. 21, 2007, pp. 1-9.
Online videos: From home videos to premium internet television content/Veoh Video Ne . . . ; "Be the first to get veohTV, Sign Up Now!", http://web.archive.org/web/20070626190750/http://www.veoh.com/ ; Jun. 26, 2008, pp. 1-6.
"Welcome to Google Video, About Google Video", http://web.archive.org/web/20070617231556/http://video.google.com/video_about.html; archived on Jun. 17, 2007, pp. 1 of 1.
Google Video, "Google Video Beta", Top 100 ComedyMusic videosSportsAnimationTV shows; http://web.archive.org/web/20070705131512/http://video.google.com/; archived on Jul. 5, 2007, pp. 1-3.
Vidiac—Create your own Internet TV Channel, "About Us, Our Mission", © 2004-2006 Vidiac, Inc., 2020 Howell Mill Rd., NW Suite C 212, Atlanta, GA 30318-1732; http://web.archive.org/web/20070701065115/www.vidiac.com/about.aspx; archived on Jul. 1, 2007, pp. 1-2.
Vidiac.com, "Start your Own Video Website!", http://web.archive.org/web/20070701064926/http://www.vidiac.com/; archived on Jul. 1, 2007, pp. 1-3.
Vimeo. Because everyone shouldn't watch everything. "You're new, aren't you?" and "Inbox" http://web.archive.org/web/20070702150421/http://www.vinneo.com/ ; archived on Jul. 2, 2007, pp. 1-5.
Vodpod: faq, "Home Explore Watch", http://web.archive.org/web/20070608131037/www.vodpod.com/site/faq; archived on Jun. 8, 2007, pp. 1-5.
Vuze by Azureus—High Definition Movies and Videos, "Vuze—The largest library of Hi-def videos. Fast, open and on-demand", http://web.archive.org/web/20070609124207rn_1/www.vuze.com/app; archived on Jun. 9, 2007, pp. 1 of 1.
Coming Soon, "Wi-FiTV™, Select From 450 Live WI-FI TV Stations", frequently asked questions (FAQ); ©2006 Wi-Fi TV; http://web.archive.org/web/20070526103125/wi-fitv.com/FAQ.aspx; archived on May 26, 2007, pp. 1-2.
Wi-FiTV™, "Home" , Station of the Week, my Wi-FiTVparty.com, your private party room, http://web.archive.org/web/20070603202546/http://wi-fitv.com/ ; archived on Jun. 3, 2007, pp. 1-2.
Info wwiTV.com, info@wwitv.com; Fran Huisman, CEO wwiTV.com B.V. The Netherlands, http://web.archive.org/web/20070709143804/wwitv.com/page/wwitv.htm; archived on Jul. 9, 2007, pp. 1 of 1.
wwwiTV.com—The ultimate guide to Live TV webcasts, 2674 online TV stations listed, Copyright © 198-2007 World Wide Internet TeleVision, http://web.archive.org/web/20070705100156/http:/wwitv.com/portal.htm; archived on Jul. 5, 2007, pp. 1-2.
YouAreTv—The best independent films, shows, and videos online., "Finally. A site that makes sense of your video online"; http://web.archive.org/web/200705222034/www.youare.tv/about/php; archived on May 22, 2007, pp. 1 of 1.
YouAreTV—The best independent films, shows, and videos online., youareTV)), "Watch great indie videos", Freshest videos on YouAreTV/ >>More New Videos, & Hottest videos in YouAreTV http://web.archive.org/web/20070611163657/http://www.youare.tv/; archived on Jun. 11, 2007, pp. 1-4.
YouTube—Broadcast Yourself. "About YouTube", © 2007 YouTube, LLC., http://web.archive.org/web/20070617231359/www.youtube.com/t/about; archived on Jun. 17, 2007, pp. 1-2.
YouTube—Broadcast Yourself, "Feature Videos", http://web.archive.org/web/20070621031645/http://www.youtube.com/;archived on Jun. 21, 2007, pp. 1-2.
Zattoo—TV to Go, "Member Login", choose your language; Please log in or sign up to download the Zatto player, "Zatto—TV to Go" http://web.archive.org/web/20070626205729/http://zattoo.com/ ; archived on Jun. 26, 2007, pp. 1-4.
Weischedel, Situational and Competitive Analysis OnNowTV.com.

\* cited by examiner

WEB-BASED VIDEO BROADCASTING SYSTEM HAVING MULTIPLE CHANNELS

CROSS-REFERENCE TO RELATED APPLICATIONS

Not Applicable

DETAILED DESCRIPTION OF THE INVENTION

Figure 1:
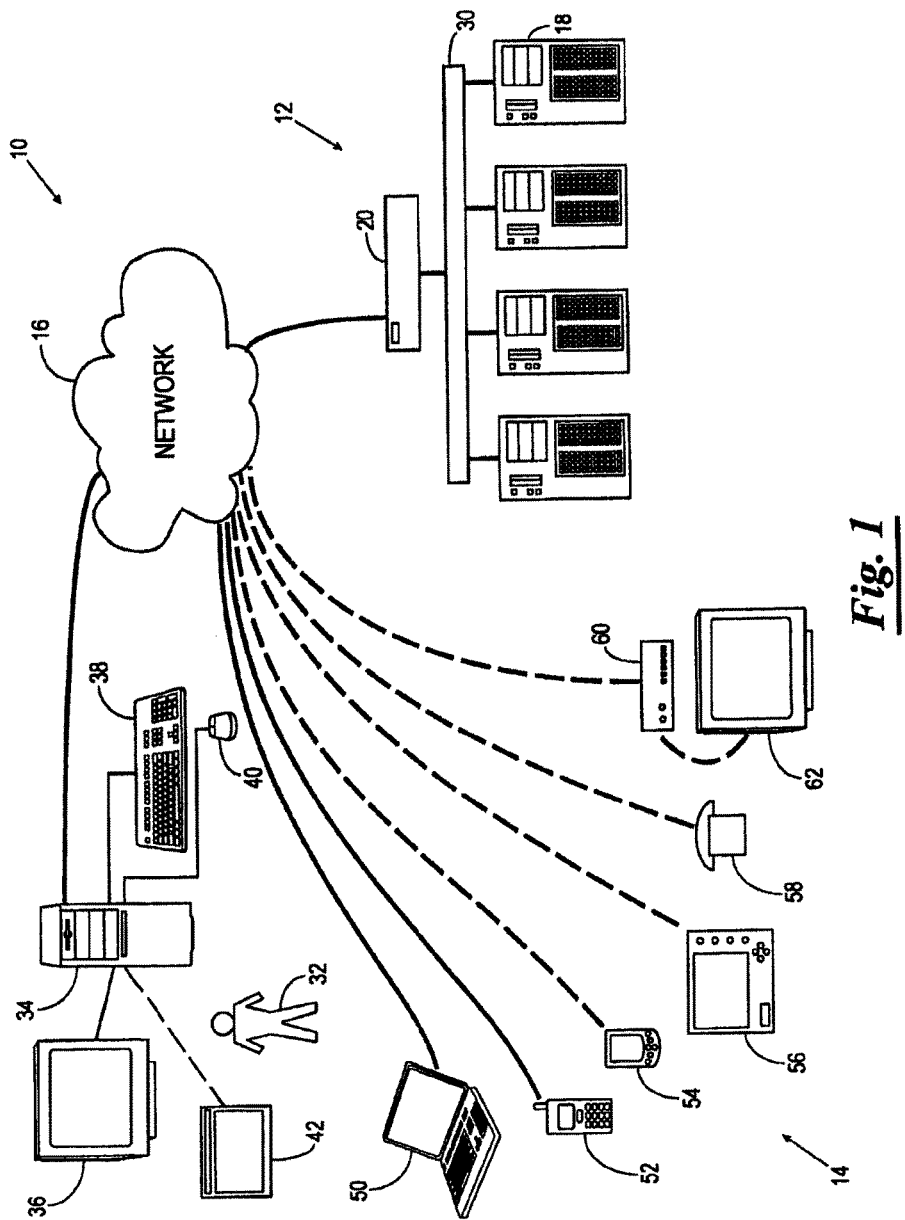
FIG. 1 is a schematic view of a video broadcasting system constructed in accordance with one embodiment of the present invention.
Figure 2:
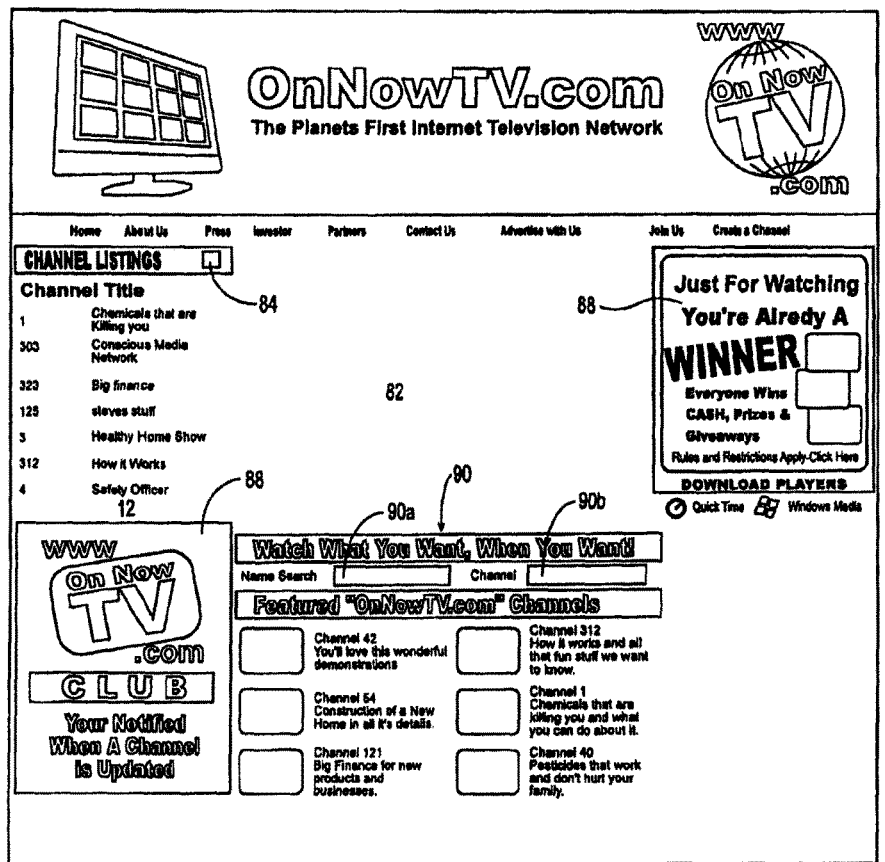
FIG. 2 is a pictorial diagram of one embodiment of a web page utilized in accordance with the present invention.

Referring now to the drawings, and in particular to FIG. 1, shown therein and designated by reference numeral 10 is a Web-based video broadcasting system having multiple channels constructed in accordance with the present invention. In general, the Web-based video broadcasting system (referred to hereinafter as the "system 10") relates generally to Web-based video broadcasting and more particularly, but not by way of limitation, to the system 10 utilizing Web-based video broadcasting in a manner which simulates television broadcasting normally provided to the user via a television set. In general, and as will be discussed in more detail below, the system 10 includes at least one web page or home page 80 (an example is depicted in FIG. 2) having a web page address which has a channel listing portion providing multiple channels which can be selected on the home page 80 so as to open a selected channel such that the user can perceive video or audiovisual content associated with the channel.

In general, FIG. 1 is an exemplary hardware diagram for the system 10. The system 10 preferably includes a host system 12, communicating with one or more user devices 14 via a network 16. The network 16 can be the Internet, cellular telephone network, or other network. In either case, the host system 12 typically includes one or more servers 18 configured to communicate with the network 16 using one or more gateways 20. When the network 16 is the Internet, the primary user interface of the system 10 is delivered through a series of web pages, but the primary user interface can be replaced by another type of interface, such as an application permitting users to access or interact with the host system 12 graphically, textually, audiovisually, or the like. This method can also be used when the user device 14 of the system 10 is located in a stand-alone or non-portable environment such as a kiosk.

The network 16 can be almost any type of network although the Internet and Internet 2 networks are preferred because of the wide support of their underlying technologies. The preferred embodiment of the network 16 exists in an Internet environment, which means a TCP/IP-based network. However, it is conceivable that in the near future, it may be advantageous for the preferred or other embodiments to utilize more advanced networking topologies. In addition, the network 16 does not refer only to computer-based networks but can also represent telephone communications or other communications. For example, as will be discussed below, in one embodiment of the system 10, the network 16 can be embodied as a cellular communication network or a satellite based communication network wherein the plurality of users can access the host system 12 using mobile communication devices, e.g., cellular telephones 52 and/or PDA 54.

The servers 18 can be networked with a local area network 30. The gateway 20 is one or more entities or devices responsible for providing access between the local area network and the network 16. The gateway 20 can also be used as a security means to protect the local area network 30 from attack from an external network such as the network 16.

The local area network 30 can be based on a TCP/IP network such as the Internet, or can be based on any other suitable underlying network transport technology. The preferred embodiment uses an Ethernet network with TCP/IP because of the availability and acceptance of underlying technologies, but other embodiments may use other types of networks such as Fiber-Channel, SCSI, gigabyte Ethernet, etc.

As discussed above, in one preferred embodiment, the host system 12 includes the servers 18. The configuration of the hardware for the servers 18 will depend greatly upon requirements and needs of the particular embodiment of the system 10. Typical embodiments, including the preferred embodiment, will include multiple servers 18 with load-balancing to increase stability and availability. It is envisioned that the servers 18 will include database servers and applications/web servers. The database servers are preferably separated from the application/web servers to improve availability and also to provide the database servers with improved hardware and storage.

The user devices 14 can be any number and type of devices. The most typical scenario of the user device involves a user 32, using a computer 34 with a monitor 36, a keyboard 38, and a mouse 40. In the preferred embodiment, the user 32 is required to use a type of software called a "browser" as designated by a reference numeral 42. The browser 42 is used to render content that is received from a source, such as the servers 18. In the modern vernacular, a "browser" refers to a specific implementation called a Web browser. Web browsers are used to read and render HTML/XHTML content that is generated when requesting resources from a web server. In the preferred embodiment, the system 10 is designed to be compatible with major Web browser vendors such as Microsoft Internet Explorer, Netscape Navigator and Opera. However, other embodiments may wish to focus on one particular browser depending upon the common user base connecting to the servers 18.

The user devices 14 can also be implemented as a portable device such as a laptop computer 50 (or handheld computer); a cellular telephone 52 with a micro or embedded Web browser; a portable digital assistant 54 (PDA) capable of wireless network access; a pen-based or tablet computer 56. In another embodiment, the user device 14 can be a cable-television box 60 or other similar device, such as a Web TV appliance, for viewing through a monitor 62 or television. Current embodiments of the system 10 can also be modified to use any of these or future developed devices.

The system 10 is designed in this way as to provide flexibility in its deployment. Depending upon the requirements of the particular embodiment, the system 10 could be designed to work in almost any environment such as a desktop application, a Web based application, or simply as a series of Web services designed to communicate with an external application. When used on a portable device, the system can also be designed to work on the portable device e.g., as a portable device specific application and/or as an icon/link directing the user 32 of the portable device to the home page 80 and/or channel page 80*a*.

Preferably, the servers 18 are accessed via an icon provided on the user device 14. The icon appears on the user device 14 and provides a symbolic representation of an instantaneous and direct connection between the user device 14 and the servers 18.

In an alternate embodiment, the system 10 can optionally be deployed as a plurality of web-based video broadcasting systems wherein each broadcasting system contains channels relating to a specific area of interest, i.e., each channel is topical. Generally, the host system 12, utilizing the plurality of servers 18 can be deployed such that more than one web-based video broadcasting system is embodied as a separate web page and/or application accessible systems operating separately within the system 10. In one embodiment, the plurality of web-based video broadcasting systems embodied within the system 10 can be directed to a particular area of interest such that each channel within the particular broadcasting system can be related to the specific topic. That is, each of the broadcasting systems can include one or more channels associated with content providers wherein each of the channels relates to a similar topic. Examples of such topics, or areas of interest, can include geographical areas, occupation, entertainment, education, self-help, do-it-yourself, commercial ideas, and the like. For example, one of plurality of systems 10 can relate to home building, home decorating, home remodeling, "green living" and the like, and include associated channels relating to such topics. Examples of such topical channels can include channels from particular manufacturers demonstrating one or more particular products, channels from home remodeling experts demonstrating home remodeling techniques, channels from constructions companies demonstrating their capabilities and/or work products, and the like.

In the alternate embodiment described immediately above, the system 10 can additionally include an entry web page (not shown) wherein a user accessing the system 10 can, via the entry web page, either select a particular web-based video broadcasting system from a list of broadcasting systems provided via the entry web page or the user can alternatively enter a unique identifier, discussed in more detail below, to thereby be routed to a desired web-based video broadcasting system, channel page 80*a*, or even a particular video associated with a content provider.

Throughout this document, the words individual, user, or consumer are generally used interchangeably, unless otherwise indicated.

Referring now to FIG. 2, shown therein is one exemplary embodiment of a home page 80 constructed in accordance with the present invention and provided by the host system 12 to one or more of the user devices 14, or otherwise in communication with the host system 12 and displayed on the user device 14. In general, the home page 80 is preferably provided with a media player window 82, a channel listing area 84, one or more advertising media areas 88, and one or more search field areas 90. Each channel is preferably provided with a unique channel identifier such that the channel listing area 84 can be further divided or segregated into channel listings and title listings corresponding to the channel listings. For example, as shown in FIG. 2, one of the channels is indicated by the numeral "1", and the corresponding title is "Chemicals that are killing you". It should be noted that the unique channel identifier for each channel can be provided in numeric and/or alphanumeric form, including any one or more numeric, alphanumeric, or symbolic digits, or any combination thereof. For example, unique channel identifiers could be 58, OK47, 32TX, @405, or the like.

In the preferred embodiment, the home page 80 and/or the host system 12 may be programmed to register at least one user parameter for at least one, and more preferably each, user accessing the host system 12 via the home page 80. For example, the host system 12 may read or otherwise access certain information on a user device such as location, name, or the like. In other embodiments, the host system 12 may be programmed to request user information, for example via an input portion of the home page 80, a pop-up input page, or the like. In the preferred embodiment, the host system 12 is further programmed to monitor the viewing habits of each viewer so as to customize the home page 80 for the user and return responses to searches that are more likely to correspond to the user's interests. For example, user parameters may include: user location, channel preference, channels viewed, total time viewed, time viewed per day, time viewed per channel, preferred subject, preferred topic, preferred business type, preferred price range, and preferred keyword. In one embodiment, the host system 12 may register and/or track such user parameters by transmitting what is commonly known as a "cookie" containing data indicative of at least one user parameter to a user device associated with the user.

It should also be understood that although only seven channels and corresponding titles are depicted in FIG. 2, this number can vary depending on how many channels the designer or administrator of the home page 80 desires. Each of the channels and/or titles in the channel listings 84 forms a hotlink or hyperlink to a channel with one or more media programs (which may also be referred to as "content files," "video files," or "program files") associated with the channel such that upon choosing or clicking upon one of the channels and/or titles, the media program linked thereto will be brought up and played within the media player window 82 to simulate a television broadcast. In another embodiment, selecting a link or hyperlink corresponding to a channel directs a users web browser to a separate web page or "channel page" 80*a* having a media player window 82*a* for displaying the at least one program video file associated with the channel, to be described in more detail below with reference to FIG. 2A.

In the preferred embodiment, when a user accesses the home page 80, the host system 12 checks for user parameters associated with or otherwise registered for the user. The host system 12 can then compare the user parameters with various channel parameters (discussed in more detail below) associated with various channels so as to customize the channel listings 84 of the home page 80. For example, the channel listings 84 can be customized to display hyperlinks for a plurality of channels, with each hyperlink corresponding to a channel having at least one channel parameter related to a user parameter of the user. For example, when a user in Oklahoma accesses the home page 80, the host system 12 can cause the channel listings 84 to display only channels having a parameter related to Oklahoma. Similarly, if a user has a user parameter indicative of an average viewing time of five minutes, the host system 12 can cause the channel listings 84 of the home page 80 to display channels having a channel parameter indicative of an average media file length of five minutes or less. User parameters and channel parameters may be used in any suitable way to organize or display channels to a user or users, or may be used in any suitable way to customize the environment of an individual user in real-time.

Although the channel listings in FIG. 2 depict only one title or media program associated with each of the channels, it should be understood that one or more media files can be associated with each of the channels. Furthermore, it should be understood that upon clicking or choosing one of the channels, the titles associated or corresponding to that channel can be brought up in the same window or in a separate window such that the one or more media files are displayed sequentially and continuously, and/or can then be chosen individually for display to the user.

In the preferred embodiment, when a channel having a plurality of media files associated therewith is selected, the plurality of media files are sequentially and continuously displayed to the user to simulate a television broadcast, until such time as the user selects a different channel, exits the home page 80 or channel page 80*a*, or closes the web browser. In such an embodiment, the order in which the plurality of media files is displayed may be varied to provide a more interesting display; and/or commercial or other secondary media files may be displayed in conjunction with the media files, for example, before, after, or in between the media files associated with the channel. Such secondary media files may be associated with the channel so as to specifically target the expected viewers of a channel; may be displayed automatically by the host system in some or all channels; may be displayed automatically by the host system in relation to corresponding channel parameters such as topic or region, to be described in more detail below; or may be targeted to a specific user or group of users, accessing one or more channels, such as in relation to one or more user parameters. In other embodiments, individual files may be selected for display by a user, or a user may be permitted to select an order for the media files to be displayed. Similarly, a user may be permitted to stop, pause, fast-forward, and/or rewind various media files associated with a channel.

As discussed above, the home page 80 is provided with one or more search field areas 90. In the example depicted in FIG. 2, the home page 80 is provided with two search field areas designated by the reference numerals 90*a* and 90*b*. The search field areas 90*a* is designated as a name search, and from that the user of the home page 80 can search by way of the name or title of various programs that can be broadcast through the media player window 82. The home page 80 is also provided with a search field area 90*b* which is labeled in FIG. 2 "channel". The search field area 90*b* can be used to search for a predetermined or known channel such as one uniquely identified with the numeral "32", so as to avoid scrolling through a list of channels.

In another preferred embodiment, the home page 80 and/or channel page 80*a* is provided with one or more search field areas (not shown) to permit a user to search for channels relevant to the user's particular interest. To this end, each channel is preferably associated with at least one, but more preferably a plurality of, channel parameters indicative of one or more properties of the channel. Similarly, individual media files may be associated with file parameters as well. For example, channel and/or file parameters may include: country, region, state, area, city, neighborhood, zip code, area code, subject, topic, business type, keyword, price range, keyword, and search priority. For example, channels with programs about home construction services may only be relevant to a particular city or state, such that it is advantageous for the channel to have a channel parameter indicative of the city or state to which it is relevant. Thus, a user can enter, for example, "home construction" and "oklahoma city" into an appropriate search field area 90 and the host system 12 can return one or more channels that are most relevant to the search criteria, that is, one or more channels with channel parameters related to the search terms. Also, the host system 12 can return one or more channels having programs or media files with file parameters that are most relevant to the search criteria, and in some embodiments, when the channel is accessed, cause the most relevant show to be displayed first. Such file parameters may be utilized in any suitable way, such as those herein with respect to user parameters and channel parameters, to organize and/or display various channels, and/or to customize the display and/or organization of various channels and/or media files within each channel for a particular user or group of users.

Figure 2A:
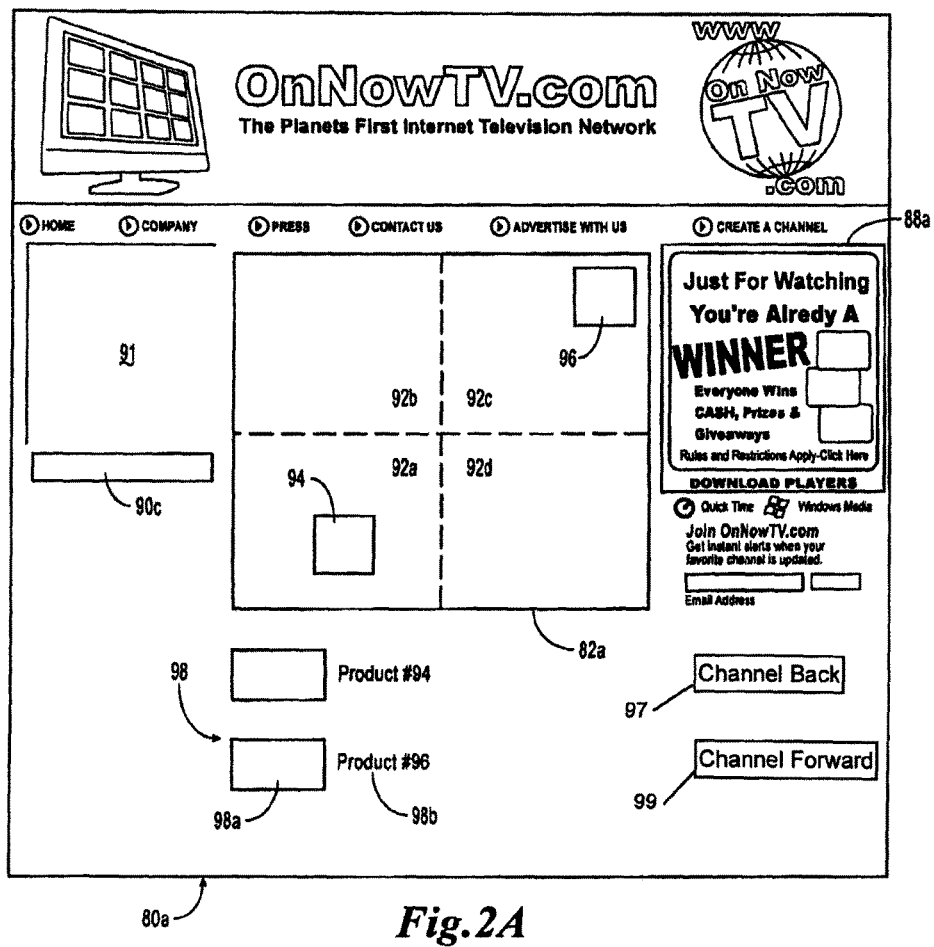
FIG. 2A is a pictorial diagram of one embodiment of a secondary web page utilized in accordance with the present invention.

Referring now to FIG. 2A, one exemplary embodiment of a channel page 80*a* is depicted in accordance with the present invention. As described below, when a user selects a channel from the one or more home pages 80 (FIG. 2), the channel may be opened in a specific channel page 80*a*. The channel page 80*a* is preferably of similar construction as the home page 80, but may be of any suitable organization, layout, design, or the like. The channel page 80*a* preferably includes a media player window 82*a*; one or more search field areas 90*c* permitting users to search the channels by channel identifier, channel parameters, or the like; one or more advertising media areas 88*a*; and a program listing area 91, depicting names, descriptions, and/or other identifiers for each of the media files associated with the channel. The channel page 80*a* can further include a channel back control 97 and channel forward control 99 permitting the user 32 to advance to the next sequential channel number or back to the earlier sequential channel number, e.g., permit a user 32 viewing channel 7 to use the channel back control 97 to move to channel 6. In one embodiment, the user 32 can use the channel back control 97 or channel forward control 99 to view all of the channels associated with the particular broadcasting system 10 deployed via host system 12. However, in a different embodiment, the user can use channel back control 97 or channel forward control 99 to view some, or none, of the other channels associated with the host system 12.

In one preferred embodiment, one or more channels may further be associated with one or more display parameters determining the manner in which the channel is displayed to users. Such display parameters may include, for example, font, background color, page color, content provider logo, additional images, page layout, or any other parameter directly or indirectly determining the manner in which the channel is displayed to a user, via either home page 80 or channel page 80*a*. For example, a content provider may wish to define a company logo to be displayed whenever the channel is accessed, or may wish to define a characteristic or trademark color to be displayed as the background color whenever the channel is accessed by a user.

In one preferred embodiment, the channel page 80*a* further includes a substantially-transparent layer 92 overlying the media player window 82*a*. The layer 92 is preferably segmented into one or more portions or regions 92*a*-92*d*. Although, the layer 92 is depicted as having four portions 92*a*-92*d*, the layer 92 may be divided into any suitable number of regions. Each portion 92*a*-92*d* aligns with a corresponding region of a media file displayed within the media player window 82*a*. Each region may selectively then be provided with a hyperlink to another web page or web site that a user may select by selecting what is preferably perceived by the user as a portion of the media file displayed within the media player window 82*a*.

In the preferred embodiment, hyperlinks can be provided for regions 92*a*-92*c* corresponding to products or other points of interest depicted within the regions 92*a*-92*d*. For example, when a product 94 is depicted at least partially in portion 92*a*, the portion 92*a* can be provided with a hyperlink to another web page or web site having information related to product 94. Similarly, when a product 96 is depicted at least partially in portion 92*c*, portion 92*c* may be provided with a hyperlink to another web page or web site having information related to product 96. One exemplary method of implementing hyperlinks for portions 92*a*-92*d* is to provide transparent .gif images and encode them into a layer above the media player window with each .gif image provided with a hyperlink such that a user perceives to be selecting a portion of the media file displayed, but is actually selecting the transparent .gif image so as to follow the associated hyperlink. Although the .gif images are described as being transparent, they may also be partially transparent, or partially opaque, so long as a user is able to perceive at least a portion of the media file displayed in the media player window.

Hyperlinks for portions of the media file may also be implemented through any other suitable means. For example, hyperlinks may be embedded into the media file itself, for example, in a Flash™ file or the like; may be defined by image mapping or otherwise defining hotzones or other regions or portions which may be selected to follow the hyperlink associated therewith; or may be implemented in any other suitable fashion. As will also be appreciated, hyperlinks corresponding to products displayed in the media file displayed in the media player window 82*a* may be alternatively, or simultaneously, be displayed in one more product link areas 98 of the page 80*a*. As depicted in FIG. 2A, such product link areas 92 may include, an image 98*a*, a product name 98*b*, and/or a product description (not shown), any or all of which may be provided with a hyperlink leading to another web page or web site having information relating to the product 94 or 96 displayed within the media file. In other embodiments, such hyperlinks may permit a user to immediately purchase the product, for example, when the user has already entered payment and shipping information, or may cause information relating to the product to be displayed in or on a portion of the page 80*a*, for example, with Flash™ encoding or other dynamic encoding such as HTML, Java Script, DHTML, XHTML, or the like.

In some embodiments, the hyperlinked regions may correspond to static objects, that is, objects, products, or other points of interest that remain in the same portion through the length of the entire media file. In such an embodiment, there is no need for the hyperlink corresponding to the portion to change. In other embodiments, it may be desirable for a hyperlink to be provided for a point of interest that moves through different portions 92*a*-92*d* through the length of the media file. In such an embodiments, the host system 12 can be programmed to vary the portion 92*a*-92*d* the portion of the media file or media player window 82*a* the hyperlink is associated with over time, so as to cause the location of the hyperlink to correspond to the location of the product or other point of interest within the media player window 82*a* over time.

In accordance with the present invention, there are at least three different categories of entities utilizing or associated with providing and/or using the host system 12, and/or the home page 80. In general, the system 10 is operated by one or more administrators (including their agents or affiliates), one or more content providers associated with at least one channel, and one or more consumers or users. The administrator preferably develops and/or maintains the structure of the host system 12 and/or the home page 80. The administrator sells or leases channels or portions of channels to one or more content providers and collects one or more different types of fees for the administrator's services. For example, the administrator can charge and collect an initial fee or start-up fee for assigning the channels to the content providers, and then collect periodic, such as monthly, maintenance fees to renew a content provider's association with a particular channel, or for a variety of services that the administrator can provide. In some embodiments, the administrator may designate one or more channels to be divided into portions and the portions sold, leased, or otherwise associated with at least one content provider, or with a plurality of content providers, so as to create a time-share type of arrangement wherein a plurality of content providers share a single channel, or wherein one or more content providers share a single channel with the administrator. The administrator may also retain one or more channels and sell individual time slots to content providers, or segment times in a continuous rotation of program segments. In yet further embodiments, the administrator may associate a channel with a content provider without charging a fee, and/or collect revenue by charging others to advertise in association with the channel, such as between content files, or through links on the home page 80 or channel page 80*a*.

Thus, the content providers are preferably sold or leased one or more channels, and the channel associated with the corresponding content provider(s) such that the content provider(s) and can upload, link, or otherwise associate one or more content files, such as audio and/or video files, with the channel in the host system 12. The content providers structure the content files, and have essentially sole control over the content which is being provided to the host system 12 with respect to each of the channels purchased or leased from the administrator. The administrator can review and/or censor uploaded or linked material within the content files so long as the administrator and content providers agree that the administrator has the right to do so. Both the administrator and the content providers are then able to sell advertising space (or time) to a variety of third parties on the homepage 80 (or related web pages), and as will be described in more detail below with respect to FIG. 4, within the content which is broadcast by or with the aid of the media player window 82.

The consumer, e.g., user 32, utilizes the user devices 14 to visit the home page 80 and/or channel pages 80*a* (FIG. 2A) and watch the content, such as video and/or audio programs selectively broadcasted through the media player window 82. The administrator and/or the content providers can sell products through a variety of advertising media areas on the home page 80 and/or channel page 80*a* (FIG. 2A) (or related web pages) of the web site and also provide suitable programming on the web site for receiving payment from the consumers due to the sale of products or services or pay-per-view channels or the like. For example, the administrator may retain a channel and charge an access fee to a user to permit the user to access or view the channel. In one embodiment, the administrator may also collect a portion of such pay-per-view type access fees charged by a content provider, or the administrator may maintain a channel and provide the content so as to collect substantially all of the access fee from the user. In yet another embodiment, the administrator may provide pay-per-view content to be displayed on a content provider's channel such that the administrator collects the fee from a user and pays a portion of the fee to the content provider in the form of a cash payment and/or as a discount or offset for maintenance fees and/or other service fees.

Figure 3:
FIG. 3 is a block diagram illustrating a method of distributing and/or authorizing one or more channels in accordance with the present invention.

Referring now to FIG. 3 in combination with FIG. 2, for the administrator or content provider to create a channel, or for the content providers to purchase or lease a channel, a content provider goes to the home page 80 and selects a link which, by way of example, is indicated in FIG. 2 with the heading "create a channel". Upon selecting the link, a series of one or more web pages are brought up to permit the content provider to create a new channel, or possibly modify an existing channel. The administrator desirably provides the status of a requested channel, that is whether or not the channel has already been assigned to a content provider or is still available for purchase or lease. To create a new channel, the administrator, via the host system 12, collects a variety of information from the content provider, such as channel number, title, user ID, password, e-mail address. The content provider fills in the information requested by the administrator and then clicks insert so as to create the new channel. It should be noted that the channel number can either be requested by the content provider or pre-assigned by the administrator.

Once a new channel is created, the content provider preferably then associates various content files, such as video files, with the channel so as to effectively provide the programming for the content provider's channel. An exemplary method of adding content is indicated in FIG. 3 by the area "Step 2". In "Step 2", the content provider provides a channel ID, a title for the content, and then a media URL indicating the location of the content file.

In one preferred embodiment, the content provider is further provided with one or more options and/or text boxes so as to specify or define one or more channel parameters to be associated with the channel that are indicative of one or more properties of the channel. As described above, channel parameters may include: country, region, state, area, city, neighborhood, zip code, area code, subject, topic, business type, keyword, price range, keyword, and search priority. Additional selection fees may further be collected from a content provider for permitting the content provider to define the at least one channel parameter, for defining certain channel parameters, for defining certain channel parameters with values in certain ranges, and/or for defining more than a predetermined number of channel parameters.

For example, a channel may initially be associated with a single geographic channel parameter corresponding to a local area in which the content provider is located, and the content provider could then pay an additional selection fee for each additional geographic channel parameter the content provider wishes to associate with the channel. In another example, a content provider could be assessed a larger fee for a search priority channel parameter that would increase the likelihood that their channel will be displayed to a user searching for channels with one or more other channel parameters. Specifically, if two channels have a topic channel parameter of fishing, one with a search priority of 9 and the other with a search priority of 2, the fishing channel with a search priority of 9 will preferably be more prominently displayed to a user searching for a fishing channel than the channel with a search priority of 2. While certain examples have been described herein, it should be appreciated that additional channel parameters may be defined, and/or additional selection fees charged for permitting a content provider to define any single channel parameter or combination of channel parameters, especially those increasing the number of users directed to a particular channel.

When the content provider has provided the various information within "Step 2," so as to provide content to the channel, the content provider clicks on the link indicated by "update" so as to save the information and the content to the channel, i.e., to associate the video file or other media file with the channel. It should be noted that the content provider can locate or provide a variety of different content files for each channel as indicated by the numerals 1, 2, 3, 4, 5, 6 which indicates that, in this example, the content provider can provide six different content files for the one channel. It should be understood that the number of content files may vary. Once the content provider has created the channel, and provided the content for the channel. Then the content provider selects "Step 3" to cause the host system 12 to upload the various media or content files to the servers 18 of the host system 12 for broadcasting the media via the home page 80 and/or a channel page 80*a* (FIG. 2A) through the media player window 82 and/or 82*a*.

In some embodiments, the host system 12 may be programmed to permit a content provider to provide a live video feed through the channel. More specifically, the provider may be able to stream a video or other media file through the channel in substantially real-time as the media file is recorded or otherwise generated. In one example, a content provider may be able to stream video of a live auction so as to permit users to view the auction via the home page 80 or channel page 80*a* and bid on items via the home page 80 or channel page 80*a*, or via telephone, email, or any other means permitting a user to interact with the content provider or other person involved in the auction. Similarly, it may be advantageous for a content provider to stream live video feeds to display a number of products, such as, in response to one or more user inquiries. For example, a car dealer may get a user inquiry about sedans that are less than 3 years old. The car dealer (or employees, personnel, or automated camera equipment) would then be able to stream, in substantially real-time, video of current inventory matching the inquiry. In another example, the car dealer may wish to hold a live interactive show in which users can communicate their interests to the car dealer, such that the car dealer can provide video of inventory pertaining to individual requests.

In addition, one or more other web pages can be provided to the content provider for permitting the content provider to pay for the purchase and/or leasing of the channel. It should be understood that payment can be provided through a variety of different manners, such as check, credit card, debit card, paypal, or the like. It should also be understood that the various payment terms and/or timings of payment can be specified or provided between the administrator and the content provider such as monthly billing, weekly billing, annual billing, or the like. It should also be understood that the payment frequency and/or amount of the payment can be determined by the traffic which is provided to the channel. For example, the host system 12 preferably records or otherwise registers in real-time the number of users accessing each channel and, optionally, each video. Thus, the periodic maintenance fees could be adjusted, based upon, or otherwise determined in relation to the number of users accessing the channel for a given period of time, such as, the period of time corresponding to the periodic maintenance fee.

Figure 4:
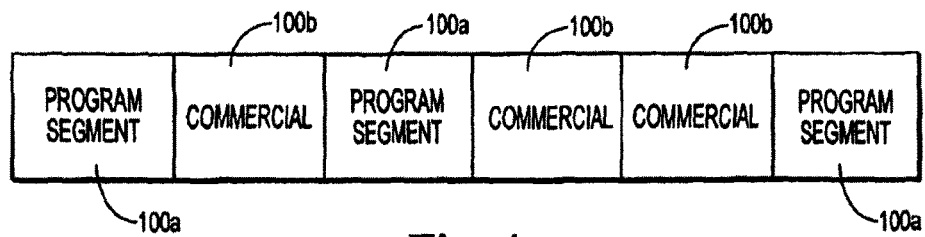
FIG. 4 is a block diagram illustrating a sequence for organizing program segments and commercials utilized in accordance with the present invention.

Referring now to FIG. 4, shown therein is a block diagram illustrating a sequence for organizing program segments 100*a* and commercials 100*b* utilized in accordance with the present invention. In general, the program implanted in one or more content files is divided into distinct program segments 100*a*, and then commercials 100*b* or other advertising media are inserted in between the program segments 100*a*. Thus, for example, in the embodiment depicted in FIG. 4, the program includes three program segments 100*a* and three commercials 100*b*. Thus, for a thirty minute program, there may be 20-22 minutes of program segments, and 8-10 minutes of commercials, depending upon the design provided by the content providers and/or administrator.

The host system 12 desirably automatically records, in real-time, the amount of users viewing each program offered by the host system. The commercials can be dynamically or automatically inserted between the program segments via a number of factors, such as the subject matter of the program, or the number of users actually watching the program.

Figure 5:
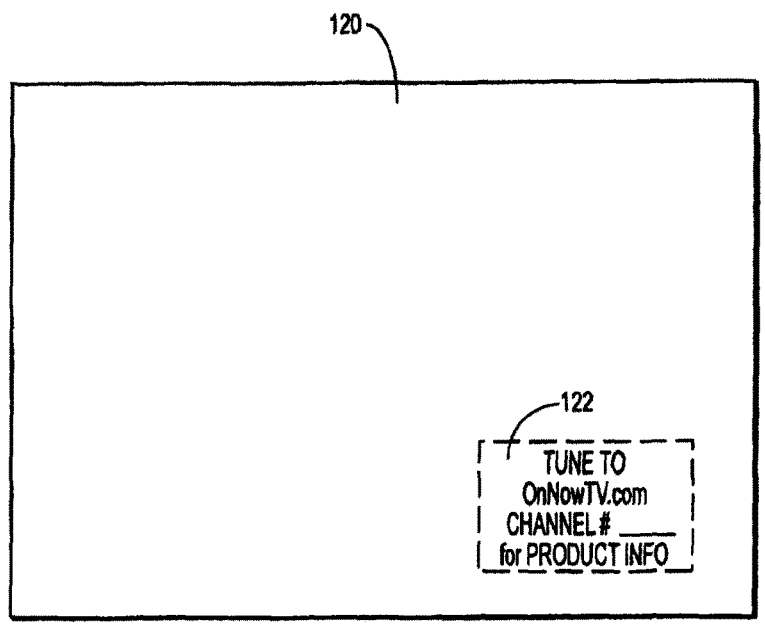
FIG. 5 is a block diagram of a product having a product information logo in accordance with the present invention.

Shown in FIG. 5 is a block diagram of a product 120 having a product information logo 122 provided thereon (or its packaging) in accordance with the present invention. The product information logo 122 preferably includes the channel number and the address of the web-site offered by the host system 12 so that users of the product can obtain information related to the product via the host system 12. The product can be almost any type of product in which content related to the product can be provided by the host system 12, such as an automobile, boat, computer program, computer, telephone system, drug, or the like.

Figure 6:
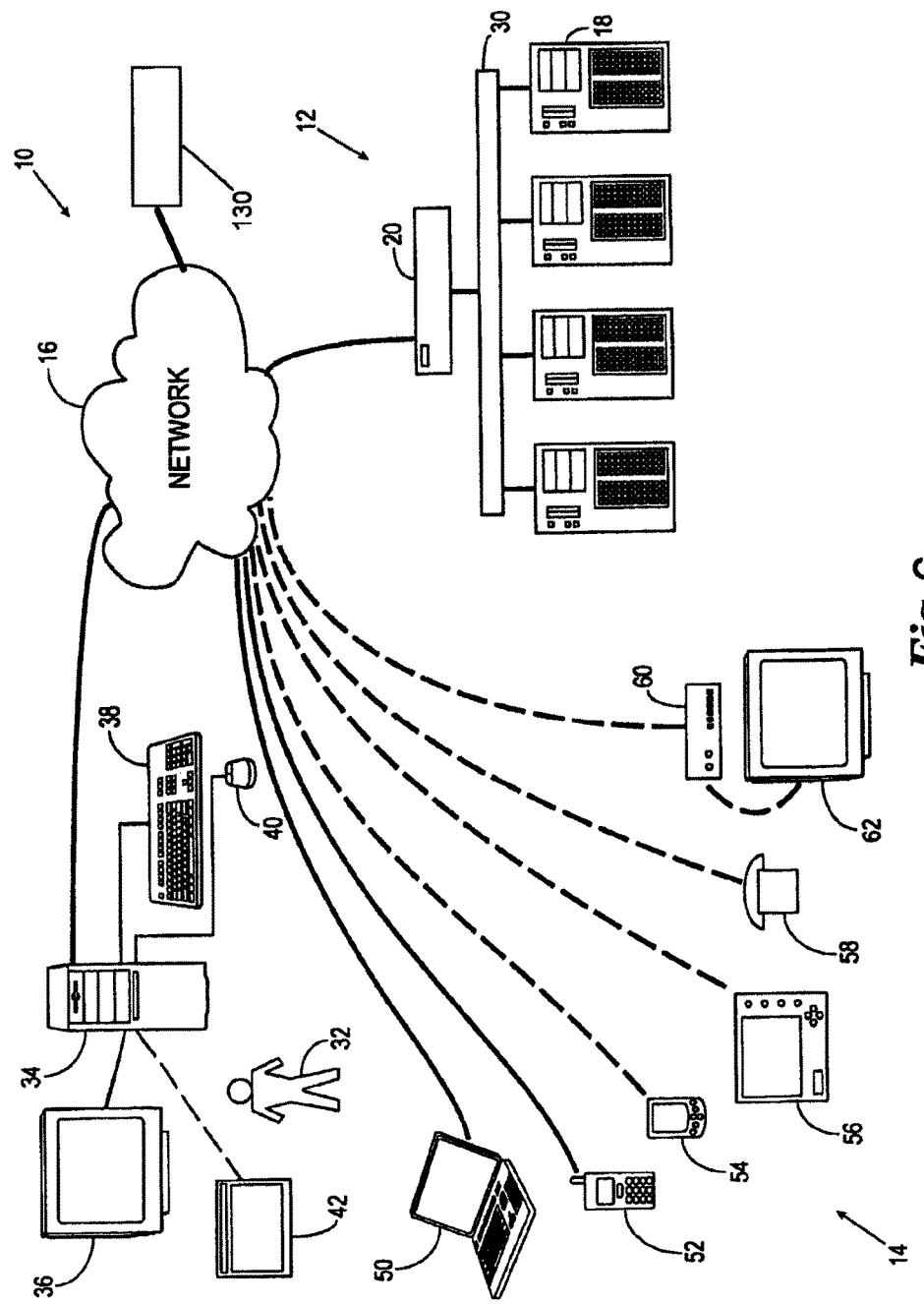
FIG. 6 is a schematic view of an alternate embodiment of a video broadcasting system constructed in accordance with the present invention.

Referring now to FIG. 6, shown therein is an alternate embodiment of the system 10 constructed in accordance with the present invention. In this alternate embodiment the content provider is provided with an option and/or text box to register and thereby associate a link source address with the content provider's associated channel with the host system 12. A link source address can be, for example, a domain name or URL (uniform resource locator) address which can be selected by, and therefore more descriptive of and/or personalized to the services or products provided by the content provider. For example, a content provider named "ACME Construction, Inc." can create a link source address named "ACMEConstructionTV.com" that is then associated with the content provider's channel registered with the host system 12. Using known redirection techniques, the content provider can provide its customers with its personalized link source address, instead of the address of the host system 12, to access their associated channel of the host system 12. The user, using the user devices 14, can then navigate to the content provider's link source address and is then automatically redirected to the channel page 80*a* of the host system 12 that is associated with that content provider. In other words, the content provider registering a link source address with the host system 12 permits a user to access the host system 12 via the link source address provided to the user by the content provider rather than the user accessing the host system 12 directly. As will be described in more detail below, the host system 12 monitors and records the details relating to user visits to the host system 12 that originated via the link source address provided by each content provider.

The link source address can be implemented, for example using the remote server 130 shown in FIG. 6 which can be connected to the network 16 and in communication with the host system 12. Alternatively, the content provider can use common URL redirection services (not shown) which are known in the art and permit the content provider to register and link their link source address with the address associated with their channel page 80*a* such that a user accessing the link source address would be automatically redirected to the channel page 80*a* associated with the content provider. Alternatively, the content provider can create and host a remote server 130 identified by the link source address and including logic that when executed by the remote server 130 causes user accessing the remote server 130 to be automatically redirected to the host system 12. The content provider can then direct their customers to their personal link source address for exemplary videos and/or presentations of their products/services. As would be understood, associating a content provider's channel page 80*a* with a link source address permits the content provider to direct users to their content through a personalized address and/or link rather than using the address of the website of the host system 12. The host system 12 can then determine and record, using known techniques, whether a user accessing the channel page 80*a* is doing so through a link source address rather than accessing the host system 12 directly using the address offered by the host system 12. In one embodiment, using the information recorded by the host system 12, the content provider can be incentivized or otherwise rewarded for directing remote users to the host system 12 via their link source address.

Another method of implementing the link source address on a user device 14, e.g., a mobile communication device 52 or 54, involves the creation and activation of a direct link to the content providers channel page 80*a* on the mobile user device 14. That is, a content provider can create and provide to a user's mobile device 14 an application or icon which, when selected and activated by the user, automatically directs the user to the channel page 80*a* associated with that content provider. The host system 12 can again determine and record, using known techniques, whether a user accessing the channel page 80*a* of the content provider is doing so through a link source address rather than accessing the host system 12 directly using the address of the host system 12.

Although examples of methods and systems implementing the link source address embodiment are described above, these examples are provided for illustrative purposes only and are not to be considered limiting in any manner. Other currently existing and future developed technological devices and/or methods are capable of enabling a content provider to direct a user to the host system 12 via a link source address that is more personalized or descriptive to the content provider. Utilization of those now existing and future developed devices and/or methods is considered within the scope of the presently described and claimed concepts. Additionally, the implementation of the link source address embodiment provides even further novel functions and features to the system 10 which are described below.

One such added functionality includes what is herein referred to as the "White Label" feature. The White Label feature permits enhanced back-end control for each content provider over the videos or other content presented to the user accessing the host 12 through the link source address associated with that content provider. When a content provider provides a link source address to the host system 12, the content provider can then be provided with additional options and/or text boxes for determining the features or content available to a user accessing the host system 12 through the link source address. For example, the content provider can then determine which of the other channels and/or media files within their host system 12 are presented and/or which order particular media files are presented. Also, the content provider can be provided with the options and/or text boxes to control other features associated with the host system 12 which the user is provided access to when the user accesses the host system 12 from the link source address.

As one example, as is described above, the system 10 can be deployed as a plurality of web-based video broadcast systems, i.e., host system 12, wherein each system 12 is organized by topic, i.e., includes channels relating to particular areas of interest. As would be understood, each host system 12 can include channels from a plurality of content providers that relate to the specific area of interest, including, for example channels from potential competitors operating within that area of interest. In one embodiment associated with the White Label feature, when the user accesses the host system 12 from a link source address, the host system 12 permits the content provider associated with that link source address to specify which of the other channels and/or media files stored on the host system 12 are available for viewing to that user. That is, when a content provider directs their customer to the host system 12 using a link source address, the host system 12 can be programmed by the content provider to present different channels or media files to the user than the channels or media files that would have otherwise been available to the user if the user had accessed the host system 12 directly, i.e., using the address of the host system 12. For example, once ACME Construction (the content provider) provides a link source address to the host system 12, ACME Construction can then specify which channels or media files are available (or not available) to the user accessing the host system 12 via their link source address. ACME Construction could, for example, permit the user to view the videos associated with its channel as well as channels associated with other content providers who, for example, do not compete with ACME Construction. Once the host system 12 determines that the user is accessing the host system 12 through the link source address associated with a particular content provider, the host system 12 uses the preferences of the content provider associated with that link source address to present only approved channels and/or video to the user.

As discussed above, the host system 12 is further programmed to monitor and record the viewing habits of each viewer. For example, the host system 12 can monitor, among other things, the channels viewed, total time viewed for a video, total time viewed per day for each user, time viewed per channel, the number of times a media file is accessed, the length of time a video is partially viewed, and the like. Utilizing the recorded information, the system 10 can further provide a visitor measuring tool which operates to reward and/or charge individual content providers based upon such things as: the number of times one of their videos is watched or their channel is visited; the length of time a user partially watches their video; whether a user accessing the host system 12 accesses channels and/or videos associated with other content providers; and the like. In one embodiment, actions taken by user could result in a point scale being assigned to the relevant content provider. For example, the host system 12 can monitor and record the amount of time a particular video is watched. Based on the viewing, either complete or partial, the host system 12 can assign a numerical score to the content provider associated with that video. The host system 12 can then collect the total number of points for each content provider over a predetermined period and then send a recurring report providing information relating to the utilization of their channel or video. Further, the host system 12 can utilize the total points for each content provider in order to determine the charges associated with each content provider. Other variations and advantages of the visitor measuring tool would become readily apparent to one having ordinary skill in the art.

Figure 7:
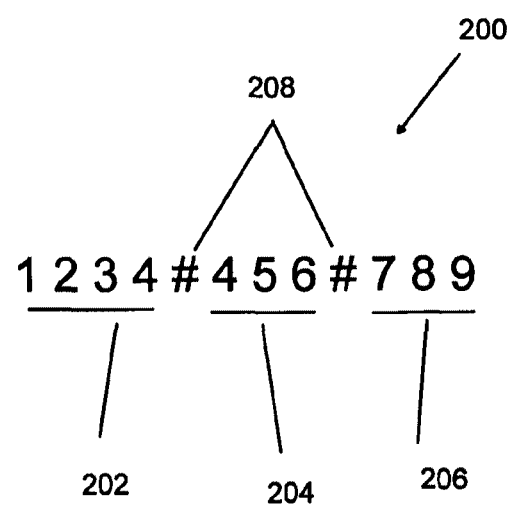
FIG. 7 is a diagram of an exemplary embodiment of an alternative navigation scheme constructed in accordance with one embodiment of the present invention.

Referring now to FIG. 7, shown therein is one aspect of a channel numbering technology, identified as navigating scheme 200, that permits a user 32 accessing the system 10 to directly access a particular web-based video broadcasting system, i.e., home page 80 of a host system 12, channel page 80a, or a specific media file associated with a content provider. Generally, as is discussed above, the system 10 can be deployed as a plurality of web-based video broadcasting systems wherein each broadcast system includes channels relating to a particular topic. In this embodiment, the system 10 can further include an entry web page that permits a user accessing the system 10 to be directed to a particular web-based video broadcasting system, i.e., a home page 80 of a host system 12, a channel page 80a, or a particular media file associated with a content provider. Additionally, a user accessing the host system 12 can then utilize a portion of the navigating scheme 200 to then be directed directly to a desired channel page 80a or a desired video. A user accessing the system 10 can utilize the navigating scheme 200 to be directed to the desired portion of the host system 12.

Generally, the navigating scheme 200 consists of a host system identifier 202, a channel page identifier 204, and a media identifier 206, separated by one or more symbols 208. The identifiers 202, 204, and 206 can be embodied as numeric, alphanumeric, symbolic digits, or any combination thereof. Further, although shown in FIG. 7 as including four numeric digits, the identifiers 202, 204 and 206 can be embodied as any number of numeric, alphanumeric, symbolic digits, or combinations thereof. Further, the identifiers 202, 204, or 206 can be selected based on a predetermined criteria or numbering scheme, and the like.

For example, the host system identifier 202 can be selected to correspond to a predetermined schema known in the art in order to improve recollection and utilization of the host system identifier 202 by the user of the system 10. As discussed above, the system 10 can be deployed as a plurality of topically differentiated web-based video broadcasting systems (a plurality of host systems 12 wherein each host system 12 includes channels relating to a similar topic or industry). In this embodiment, each broadcasting system (host system 12) can be identified by a unique host system identifier 202.

As one example, the host system identifier 202 identifying each host system 12 can be selected to correspond to the North American Industry Classification System (NAICS), or its predecessor, the Standard Industrial Classification system (SIC). As understood in the art, the NAICS is generally a system utilized by Federal statistical agencies to classify business establishments based on the similarities in the processes used to produce goods or services. In the embodiment described above, the host systems 12 including channels relating to a particular topic can be assigned and/or identified by a unique host system identifier 202 that corresponds to the NAICS classification code fitting within that industry/topic. For example, a host system 12 that includes a plurality of channels relating to new single-family housing construction can be identified by the host system identifier "236115" that corresponds to the 2007 NAICS code identifying that industry. Utilization of the NAICS schema, which is known in the art and readily understood, to identify each topical host system 12 results in uniformity and ease of use of the system 10. As would be readily understood in the art, other presently known and future developed classification schema can be used to determine the host system identifier 202 that will be assigned to each web-based video broadcasting system. Alternatively, the host system identifier 202 can be selected from a random series of identification characters or numbers that can be descriptive of the topic of the host system 12.

The channel page identifier 204 can be used to identify each channel within a host system 12 wherein each channel is associated with a particular content provider. The channel page identifier 204 can be selected from other presently known or future developed schema. However, other schema can be employed to identify each channel associated with a content provider that is readily understood by users of the host system 12. For example, for a host system 12 including a plurality of channels relating to home improvement can include channels from content providers relating to construction companies, sub-contractors, manufacturers of parts associated with home improvement, educational channels relating to installation and maintenance, and the like. The host system 12 can assign each channel a channel page identifier 204 that identifies the desired content provider and permits ready access to a desired channel. That is, the host system 12 can employ a schema to identify each channel by a channel page identifier 204 that corresponds to similar content providers. For example, each host system 12 can include a plurality of channels associated with content providers and identified by channel page identifiers 204 within a predetermined range. In one example, each channel associated with content providers relating to equipment manufacturers can be assigned channel page identifiers 204 within the range of 1000-1999, and content providers relating to contractors can be assigned channel page identifiers 204 in the range of 2000-2999, and so on. As can be seen, any number of schema can be developed and utilized to assign and identify each channel within a host system 12 in order to improve recollection and utilization of the navigating scheme 200 by the user. Alternatively, each channel page identifier 204 can be assigned to be, for example, descriptive of the content provider associated with that channel.

As described above, the media identifier 206 permits a user of the host system 12 to navigate directly to a desired media file, e.g., a video file, associated with a particular content provider. The media identifier 206 can be selected and assigned to each media file based on a predetermined schema to ease recollection and utilization of the navigating scheme 200 by the user.

In a preferred embodiment, the media identifier 206 assigned to each medial file can be selected from a predetermined range that corresponds to the nature of the media file. As discussed above, each content provider can upload a plurality of media files wherein each media file can include distinct information relating to the content provider. The content provider can upload media files relating to such things as general matters, products or services provided by the content provider, third party testimonials about the content provider, individuals associated with the content provider, bargains or specials offered by the content provider, instructional videos, entertainment media, and the like. The system 10 can preferably utilize a predetermined schema to assign each media file a unique media identifier 206 that fits within a predetermined range or sequence and depends on the nature of the video file. For example, the system 10 can assign each medial file including information relating to general matters a media identifier 206 within the range of 100-199, media files including information relating to products or services provided by the content provider a media identifier 206 within the range of 200-299, and so on. Although the media identifier 206 is described above as a three digit number, the media identifier can be more or less than three digits and still comply with the above-described numbering schema. That is, if the content provider has more than 100 media files relating to general matters, the media identifier 206 can be assigned within the range of 1000-1999 instead of 100-199, and still fall within the schema described above. As would be understood, a user accessing a channel page 80a who is interested in viewing media files associated with products or services offered by the content provider associated with that channel can utilize the numbering schema described above to know that such media files can be found at media identifier 206 numbers starting at 200 or 2000. Thus, regardless of which host system 12 the user is accessing, the user can readily understand and employ the numbering schema to be directed to media files containing the desired information.

As would be understood, the plurality of servers 18 operating on the host system 12, in cooperation with databases, look-up tables, and the like, includes logic that, when executed by the host system 12, recognize when a user inputs the host system identifier 202, channel page identifier 204, or the media identifier 206, and, in response, correlates the inputted identifier to the address of the applicable home page 80 of the host system 12, the channel page 80a, or the media file stored on the host system 12. Such address correlation and redirection techniques are known in the art and therefore are not described further herein.

The host system identifier 202, the channel page identifier 204, and the media identifier 206 have been described using a variety of numbering schemes to assist identification of desired content by a user, other schemes can be utilized without departing from the scope and intent of the presently disclosed and claimed concepts.

In operation, the user of the system 10 can employ the navigating scheme 200 to be directed to a desired content within the system 10. However, the manner of use of the navigating scheme 200 depends, at least in part, upon at what point within the system 10 the user accesses the system 10.

In instances where the user accesses the system 10 via the entry web page, the user can use the navigating scheme 200 to be directed to the desired content within the system 10. For instance, if the user wishes to be directed to a particular home page 80 associated with a host system 12, the user can enter the host system identifier 202 and thereby be directed to the desired host system 12. If the user accessing the system 10 via the entry web page wishes to be directed to a specific channel page 80a of a particular host system 12, the user can input the host system identifier 202 and the channel page identifier 204, separated by the symbol 208, and thereby be directed directly to the desired channel page 80a of the channel. Similarly, the user accessing the system 10 via the entry web page wishing to access a specific media file can enter the host system identifier 202, the channel page identifier 204, and the media identifier 206, separated by symbols 208, and thereby be directed directly to the desired media file.

In instances where the user accesses a particular host system 12 directly, the user can then enter the applicable channel page identifier 204 to be directed to a desired channel and/or the user can enter the channel page identifier 204 and the media identifier 206, separated by symbol 208, and thereby be directed to the desired media file. Lastly, in instances where the user accesses a particular channel page 80*a* of a channel, the user can enter the media identifier 206 and thereby be directed to the desired media.

As would be understood, utilization of the navigating scheme described above permits a user to access a desired content within the system 10 directly, i.e., without having to drill down to the desired content via a plurality of pages offering numerous options for the user to select and/or through traditional search results which can be extensive and difficult to locate the desired content. Using any or all of the above described numbering schema provides a readily understood and consistent structure to content contained in each level of the system 10. The navigating scheme 200 organized using the numbering schema provides a system 10 wherein the user can be automatically directed to the desired content to thereby be educated, entertained, and the like.

What is claimed is:

1. A content broadcast system comprising:
   a non-transitory computer readable medium storing at least one web page having a web page address, the at least one web page in communication with a host system to permit a plurality of users and a plurality of content providers to access the host system;
   wherein the host system is programmed to permit at least one content provider to register at least one channel and associate the channel with the content provider, wherein the channel is associated with a channel page identification number;
   wherein the host system is further programmed to permit the at least one content provider associated with the channel to selectively upload to the host system at least one content file and associate the at least one content file with the channel, wherein the at least one content file is further associated with a media identification number and the channel page identification number, wherein the at least one content file is accessible by a user through a combination of the channel page identification number and the media identification number;
   wherein the host system is further programmed to permit the at least one content provider to associate a link source address with the channel, wherein the link source address is different from the web page address of the at least one web page, and wherein the user accessing the link source address is redirected to the web page address;
   wherein the host system is further programmed to permit the at least one content provider to determine which of the channels registered with the host system are accessible by the user based at least in part on the user's method of accessing the host system from the link source address rather than accessing the host system by the web page address; and
   wherein the host system is adapted to determine if a user is accessing the host system by the web page address or by the link source address, and, in response to the user accessing the host system by the link source address, provide the user access to the channels as determined by the content provider for such a user that accesses the host system by the link source address rather than by accessing the host system by the web page address.

2. The content broadcast system of claim 1 further comprising:
   wherein the host system is adapted to monitor and store user information indicative of the content files accessed by the user; and
   wherein the host system is adapted to provide to the content provider the user information indicative of the number of users who accessed content files uploaded by the content provider.

* * * * *